United States Patent [19]

Kagi

[11] Patent Number: 4,612,490
[45] Date of Patent: Sep. 16, 1986

[54] METHOD AND SYSTEM OF BRAKING AND ASYNCHRONOUS MOTOR

[75] Inventor: Ulrich Kagi, Winterthur, Switzerland

[73] Assignee: Sulzer Brothers Limited, Winterthur, Switzerland

[21] Appl. No.: 703,721

[22] Filed: Feb. 21, 1985

[30] Foreign Application Priority Data

Feb. 24, 1984 [CH] Switzerland ............... 920/84

[51] Int. Cl.⁴ .............................. H02P 3/24
[52] U.S. Cl. ...................... 318/761; 318/760
[58] Field of Search ................. 318/759–762

[56] References Cited

U.S. PATENT DOCUMENTS

| | | | |
|---|---|---|---|
| 3,376,485 | 4/1968 | Shibata et al. | 318/762 |
| 3,708,734 | 1/1973 | Rowe | 318/762 |
| 3,866,097 | 2/1975 | Anzai et al. | 318/761 |
| 4,417,191 | 11/1983 | Schmidt | 318/760 |

Primary Examiner—David Smith, Jr.
Attorney, Agent, or Firm—Kenyon & Kenyon

[57] ABSTRACT

A braking direct current (d.c.) ($u_g$) is injected by way of a diode into at least one of the motor windings at a make time ($T_1$) which occurs after the tripping of the motor. The make time lies between, at the earliest, a first reference time ($T_{r1}$) and, at the latest, a second reference time ($T_{r2}$), the braking d.c. voltage ($u_g$) being substantially equal to a back-voltage ($u_r$) of the motor winding at the first reference time. The second reference time leads, by 5% of the full periodicity of the network voltage, the first peak in time of the back voltage to occur after the first reference time. The polarity of the braking d.c. voltage ($u_g$) at the make time ($T_1$) is opposite to the polarity towards which the back-voltage ($u_r$) is tending at the first reference time.

The braking accuracy of d.c. braked asynchronous motors is improved without increased loading of the motor by relatively heavy currents.

17 Claims, 9 Drawing Figures

⬚ = Ug − Ur

METHOD AND SYSTEM OF BRAKING AND ASYNCHRONOUS MOTOR

This invention relates to a method and system of braking an asynchronous motor and, particularly, a motor connected to a three-phase network.

Heretofore, it has been known to brake an asynchronous motor which is connected to a three-phase network having a network voltage by means of injecting a braking direct current voltage by way of a unidirectional path means into at least one of the motor windings at a make time which occurs after a tripping of the motor.

However, in techniques of this kind, there are considerable spreads in the braking distance and braking time until the motor stops. For example, the braking time may vary approximately by a factor of two. The braking distance spread is even greater. These differences are not usually troublesome. However, when the asynchronous motor is used for positioning work, for instance, to position valves, substantial braking currents are needed because of the spreads. These heavy currents mean that the motor and associated control equipment are very expensive.

The reason for the spreads is that after tripping of the motor, the effect to the remanent magnetic field in the motor rotor, which continues to rotate by inertia, induces an a.c. voltage known as the back-voltage in every stator winding. This back-voltage is further in synchronism with the instantaneous speed of the decelerating motor. A braking direct current (d.c.) voltage applied to a stator winding of the motor is thus alternately boosted and depressed by the back-voltage according to whether the polarity is like or unlike the polarity of the braking d.c. voltage. As a result, the braking time and associated braking distance depend upon the random phase position of the back-voltage at the make time. This state of affairs is made even more confused by the fact that the back-voltage decreases as the motor slows down and that the d.c. voltage reduces the remanent field.

Accordingly, it is an object of the invention to improve the accuracy of braking of d.c. braked asynchronous motors without increasing motor loading by substantial currents.

Briefly, the invention provides a method and system for braking an asynchronous motor having a plurality of windings connected to a three-phase network having a network voltage. The method comprises the steps of tripping the motor, thereafter injecting a braking direct current voltage through a unidirectional path into at least one of the motor windings at a make time and of selecting the make time between a first reference time and a second reference time. In accordance with the invention the first reference time is at the time where the braking d.c. voltage is closest to a back-voltage of the motor winding at the first reference time. The second reference time is that which leads a first peak in time of the back-voltage which occurs after the first reference time by an amount equal to 5% of the full periodicity of the network voltage. In addition, the braking d.c. voltage at the make time has a polarity opposite to the polarity towards which the back-voltage tends at the first reference time. It has been found that by choosing the make time as above in light of the voltage polarities at such time (although, on average braking starts later than in previously methods) not only is the braking-distance spread reduced to a small proportion of the normal value but also the maximum braking time is reduced.

Preferably, the braking d.c. voltage is equal to the back-voltage at the first reference time.

In one advantageous embodiment, the injection of the braking d.c. voltage is triggered in response to one phase of the back-voltage of one motor winding passing through zero. Again, the polarity of the braking d.c. voltage is opposite to the polarity of the back-voltage immediately after passage of the back-voltage phase through zero.

The injection of the braking d.c. voltage may also be triggered in response to one phase of the network voltage passing through zero, again with the polarity of the braking d.c. voltage opposite to the polarity of the network voltage immediately after passage of the network voltage phase through zero. This is possible because the motor rotor continues to rotate for a short time after motor tripping and before the making of the braking d.c. voltage. Hence, the back-voltage of the motor and the network voltage remain, to some extent, co-phasal. Since the network voltage can be more simply measured than the back-voltage, this method is very often advantageous.

Still further, the injection of the braking d.c. voltage can be triggered in response to one phase of a braking voltage formed of the heterodynamic sum of the back-voltage and the braking d.c. voltage passing through zero. Again, the polarity of the braking d.c. voltage is opposite to the polarity of the braking voltage immediately after passage of the braking voltage through zero. This technique is advantageous when the braking d.c. voltage is less than the peak instantaneous value of the back-voltage.

In order to eliminate the need for batteries which are subject to wear, the current supplied from the three-phase network can be recitified to the motor to produce the braking d.c. voltage.

In addition, the voltage can be converted prior to rectification. The use of a voltage conversion is a simple means of limiting motor loading in braking to an acceptable value.

In still another embodiment, the braking d.c. voltage can be injected into a plurality of the motor windings with braking of the motor being responsive only to the winding in which injection occurs first. This helps to further reduce the duration of braking while preventing interaction between the various windings.

In order to further increase braking accuracy, two direct current voltages of opposite polarity may be produced while injecting only the first of the two voltages to satisy the braking conditions. Alternatively, two phase-shifted braking voltages may be produced while only the first of these voltages to satisy the injection conditions to the winding is connected to the motor.

The system of the invention comprises a motor actuator for selectively connecting and disconnecting the winding from the network, means for producing a braking d.c. voltage in response to disconnection of the windings from the network for injection to at least one of the motor windings and a trigger responsive to disconnection of the windings from the network in order to control the injection of the produced d.c. voltage to the winding. Thus, the trigger controls the making of the braking d.c. voltage in dependence upon the tripping of the asynchronous motor.

In one embodiment, the means for producing the d.c. voltage includes a direct current supply means for producing the braking d.c. voltage and which is connected to a first input of the trigger. In addition, a first connecting line is disposed between one of the feed lines and the supply means while a second connecting line is connected between a second feed line to the motor winding and the supply means in order to receive the produced braking d.c. voltage from the supply means. Further, a switching element is disposed in the second connecting line for selectively opening and closing the line along with a unidirectional path means for conveying the braking voltage to the winding. Further, a third connecting line is connected between at least one of the feed lines and a second input of the trigger in order to convey a back-voltage in response to dis-connection of the windings from the network. Still, further, an AND-GATE is provided with one input connected to an output of the trigger to receive a control signal in response to a zero voltage at the first input of the trigger. A second input of the gate is also connected to the motor actuator to receive a second control signal in response to actuation of the actuator. Also, an output of the gate is connected to the switching element in order to close the switching element in response to the presence of the control signals at the inputs so that the braking voltage may flow from the supply means through the second connecting line to the winding.

In order to eliminate the need for a battery, use may be made of a transformer as the supply means for the braking d.c. voltage. In addition, a rectifier circuit arrangement may be connected with the transformer with the unidirectional path means therein. Such a rectifier circuit arrangement may include thyristors while the switching element is a trigger connected to the thyristors. Still further, the thyristors may be RC-wired and connected to each other to form a Graetz bridge.

In order to further reduce the braking distance, a plurality of thyristors may be connected in the feed lines in order to connect the motor to the network. In this case, at least one trigger is connected to and between the thyristors and a switch which acts as a motor actuator and which generates a pulse sequence in order to enegerize the trigger.

These and other objects and advantages of the invention will become more apparent from the following detailed description taken in conjunction with the accompaning drawings wherein.

Figure 9:
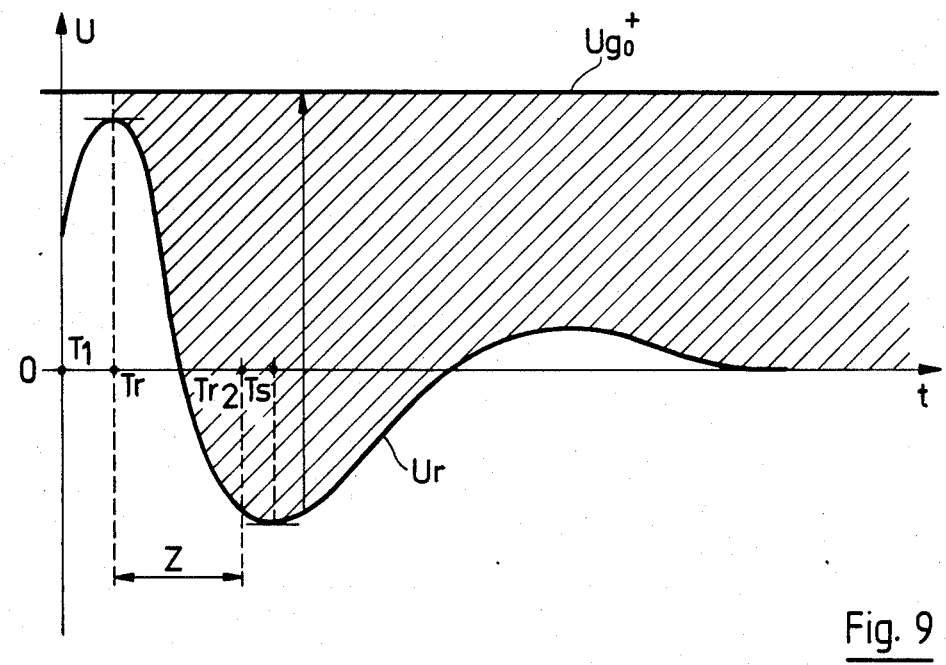
Figure 7:
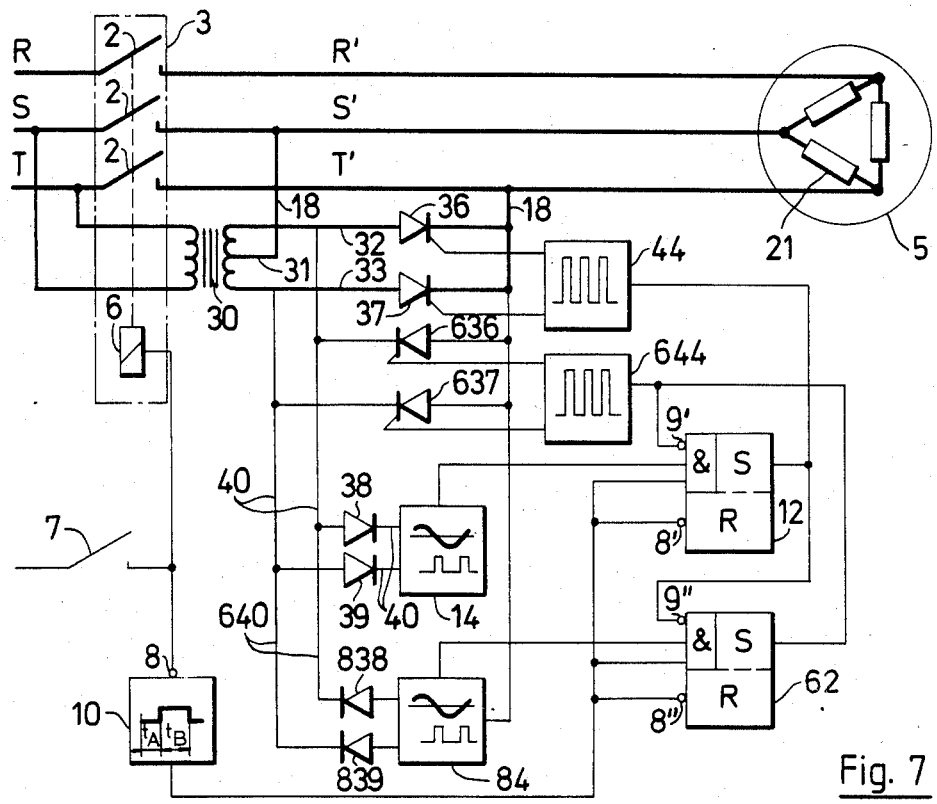
Figure 5:
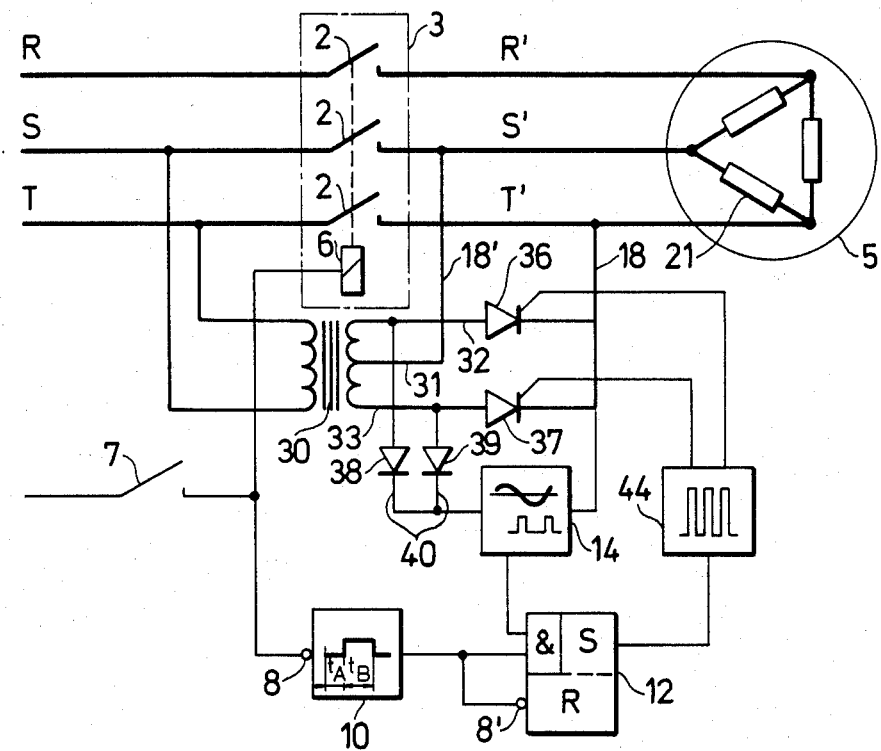
FIG. 5 illustrates a circuit diagram of a modified system employing a transformer according to the invention.
Figure 6:
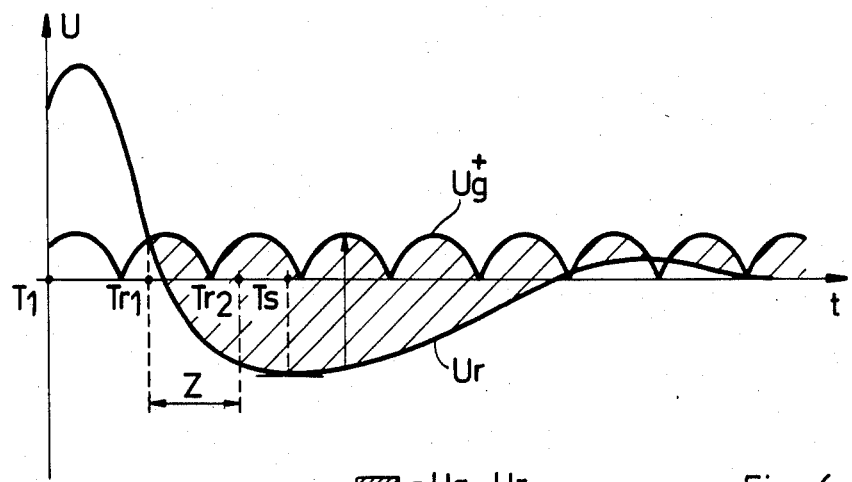
Figure 8:
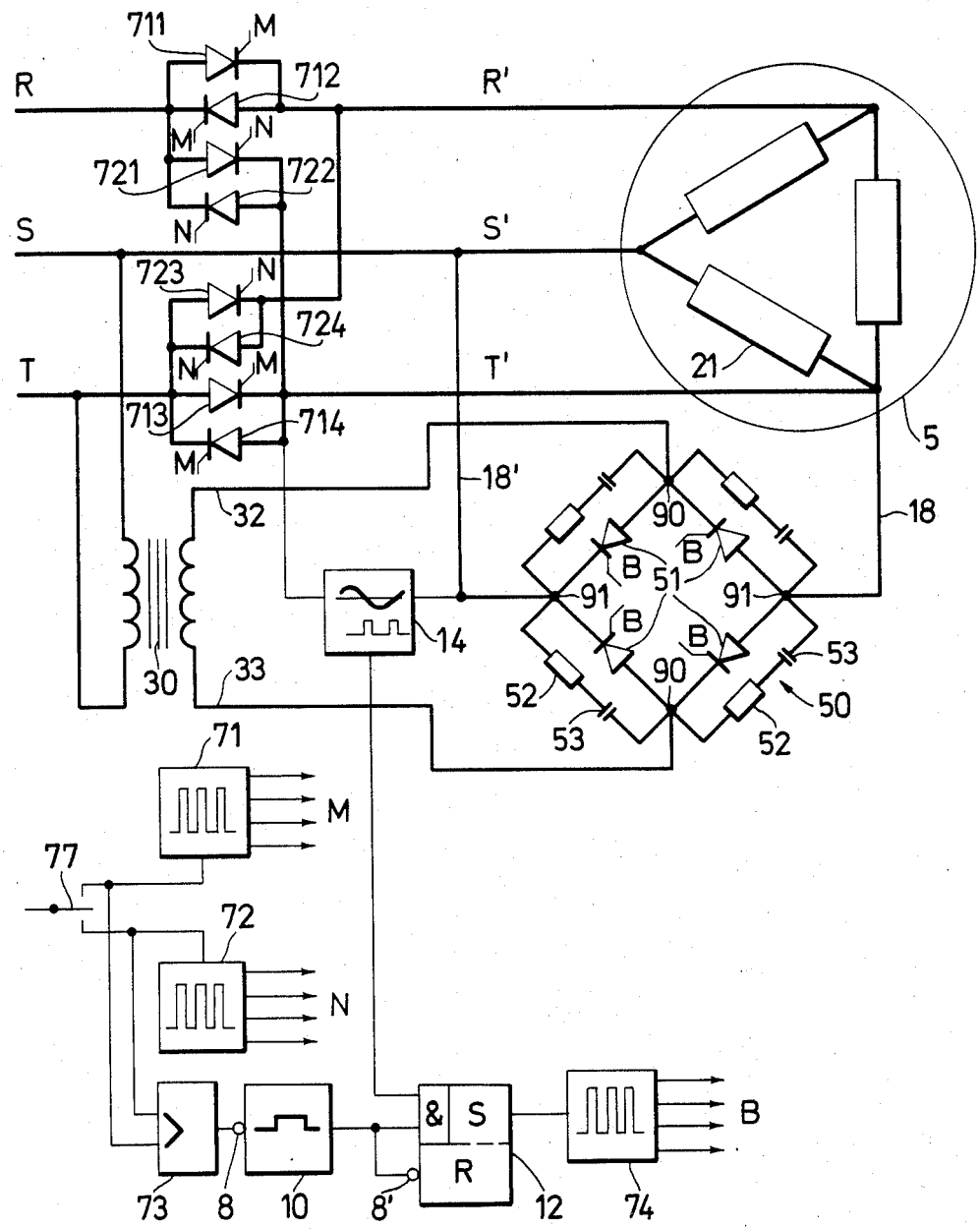

FIG. 6 graphically illustrates the timing of the back voltage and d.c. braking voltage produced in the system of FIG. 5;

FIG. 7 ilustrates circuit diagram of a further modified system according to the invention;

FIG. 8 illustrates a circuit diagram of a modified system employing a Graetz bridge according to the invention; and FIG. 9 graphically illustrates the timing of a braking d.c. voltage of greater value than a back voltage.

Figure 1:
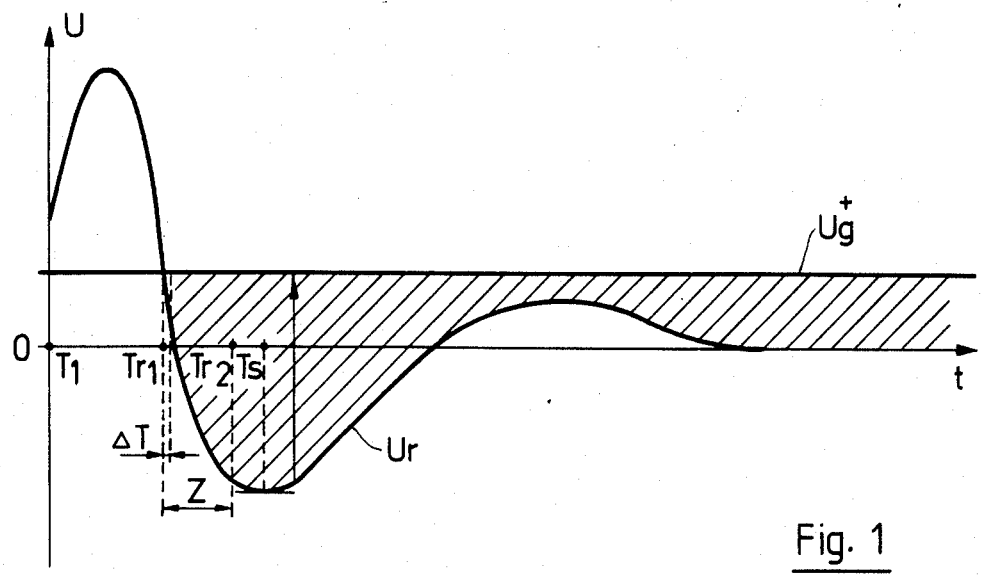
FIG. 1 illustrates a graph of the timing of the braking d.c. voltage $u_g$ and back-voltage $u_r$ in a winding of an asynchronous motor during a braking (hatched zone) according to the invention.
Figure 2:
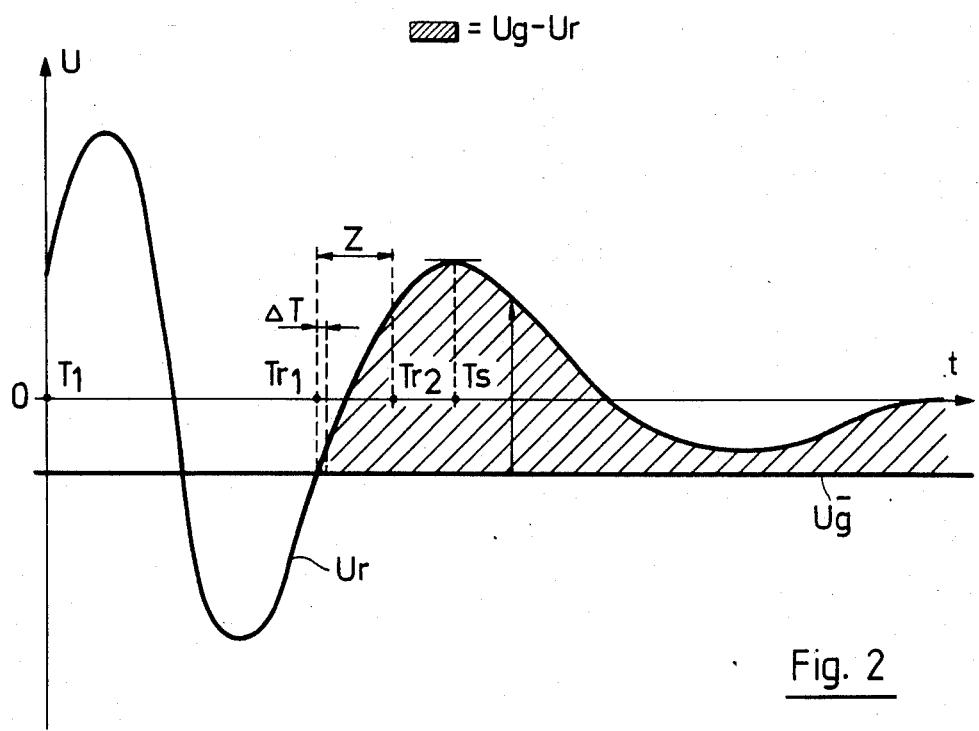
FIG. 2 illustrates a graph similar to FIG. 1 except that the braking d.c. voltage is negative.

Referring to FIGS. 1 and 2, the voltage u in a winding of an asynchronous motor is plotted along the ordinate and the time t is plotted along the abscissa. After the motor has been tripped at a time $T_1$, a.c. back-voltages $u_r$ (only one of which is shown in each of FIGS. 1 and 2) are produced in the motor windings. A d.c. supply provides a braking d.c. voltage $u_g$. The two voltages $u_r$, $u_g$ are combined with one another at a make time which occurs within a time interval z between a first reference time $T_{r1}$, when the back voltage $u_r$ and the d.c. voltage $u_g$ are equal to one another, and a second reference time $T_{r2}$; the same leads, by 5% of the full periodicity of the network voltage, the first peak in time of the back-voltage $u_r$ to occur after the first reference time $T_{r1}$. The peak referred to has the reference Ts. The network voltage is, for example 380 V at a frequency of 50 Hz. The d.c. voltage $u_g$ is of positive polarity—i.e., opposite to the negative polarity towards which the back voltage $u_r$ is tending at the first reference time $T_{r1}$.

Referring to FIG. 2, the d.c. voltage $u_g$ may also be of negative polarity so that, at the reference time $T_{r1}$, the back voltage $u_r$ is tending away from a negative and towards a positive polarity. FIGS. 1 and 2 are indentical in other respects, the difference between the d.c. voltage $u_g$ and the back voltage $u_r$—i.e., the actual measure of braking action—after the make time being shown hatched.

Referring to FIG. 9, a positive braking d.c. voltage $u_g$ greater than the maximum back voltage $u_r$ may also be injected. In this case, the time interval z in which the make time lies extends from a first reference time $T_{r1}$, at which the braking d.c. voltage $u_{go}$ is most similar to the back voltage $u_r$, to the second reference time $T_{r2}$ which, as in FIG. 1, is determined by the next back-voltage peak to occur.

Figure 3:
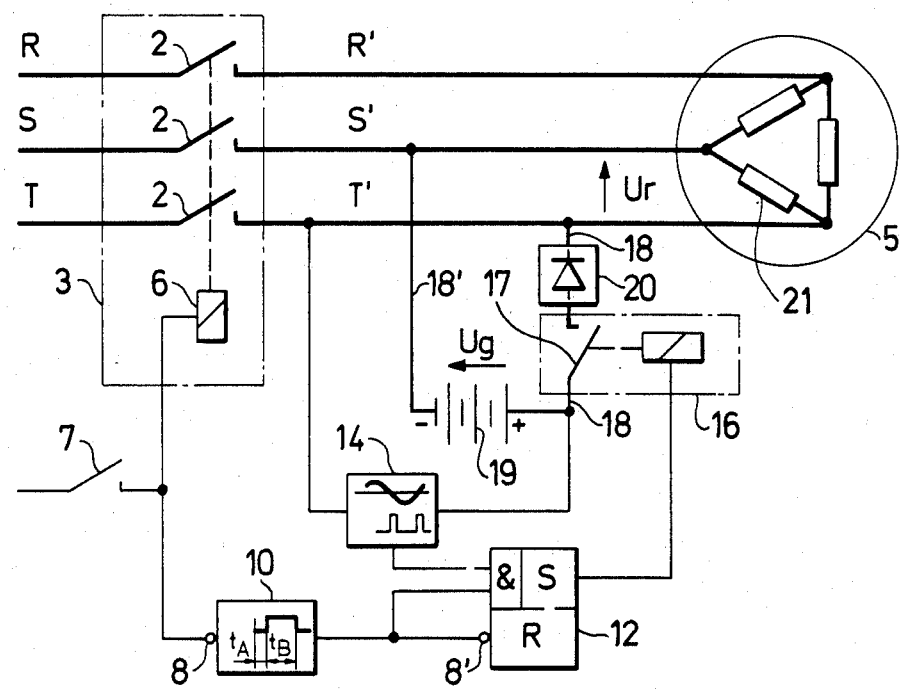
FIG. 3 illustrates a circuit diagram of one system employing a single trigger according to the invention.

In the system shown in FIG. 3 three phases R, S, T of a three-phase network are connected by way of three contacts 2 of a contactor 3 and three conductors R', S' T' to three stator windings of an asynchronous motor 5. The contactor 3 has a winding 6 which, by way of a switch 7 serving as motor actuator, can be energized by a power supply (not shown). Also, the output of switch 7 is connected, with inversion—as indicated by an inversion symbol at an inversion station 8—to a timer 10 which at each opening of the switch 7 outputs, with a delay of a brief time interval $t_A$, a 1 signal for an adjustable period $t_B$ but which in other conditions outputs a 0 signal. The time interval $t_A$ is such that, once elapsed, the phases R, S, T have definitely been separated from the conductors R', S', T' at the contacts 2.

The system also has means for producing a braking current voltage in response to disconnection of the motor windings from the network for injection to at least one of the windings. This means includes a store 12 which has an input on an R-side to which the output of the timer 10 extends by way of another inversion station 8'. The store 12 is embodied by a known two-state trigger circuit arrangement or flipflop. The output of the timer 10 is also connected to an AND-gate input on an S-side of the store 12. A trigger 14, whose function will be described hereinafter, is also operative on the AND-gate input. The output of the S-side of the store 12 extends to a switching element 16 embodied by a relay whose contact set 17 is disposed in a connecting line 18 connected to the conductor T'. A unidirectional path means 20, such as a diode, is also disposed in the line 18. The forwards direction of the diode 20 corresponds to the polarity of the battery 19. A second connecting line 18 extends by way of a d.c. supply means such as a battery 19 to the conductor S' and is connected to the first line 18'.

The trigger 14 has one input connected to the conductor T' between the contactor 3 and the junction of conductor T' with line 18 and another input connected to the junction of the line 18 with the line 18'. The latter input of trigger 14 is therefore connected to the same pole of the battery 19 as the conductor T'. The trigger 14 outputs a short 1 trigger signal whenever the difference between the voltages applied to its inputs passes through zero. The S-output of the store 12 energizes the relay 16 immediately two 1 signals—i.e., a 1 signal from the timer 10 and a 1 signal from the trigger 14—are present simultaneously at the AND-gate input. Energization of the relay 16 ceases only when the R-side of the store 12 receives a 1 signal—i.e., when the output signal of the timer 10 disappears.

The system illustrated in FIG. 3 operates as follows:

With the switch 7 closed, the contactor 3 is in the energized state and the motor 5 receives current from the three-phase network through the conductors R', S', T'. The relay 16 is open. The network voltage oscillates at the first input of the trigger 14. Every passage through zero of the total voltage formed by the difference between the battery voltage $u_g$ and the network produces a 1 trigger signal, but the same is ineffective since the timer 10 is applying the 0 signal to the store 12.

When the switch 7 opens at the time $T_1$, as shown in FIG. 1, the contactor 3 disconnects the conductors R', S', T' from the network so that the conductors carry the back-voltage induced by the rotating rotor (not shown) in the stator windings. The first input of trigger 14 experiences a back-voltage pattern $u_r$ which while still undisturbed is substantially sinusoidal. The braking d.c. voltage $u_g$ produced by the battery 19 and the back voltage $u_r$ are equal to one another for the first time at the time $T_{r1}$, so that the voltage $u_g - u_r$ present at the second input of the trigger 14 drops to zero for the first time after the opening of the switch 7. The trigger 14 therefore outputs a 1 trigger signal which is supplied to the and-input of the store 12.

When the switch 7 opens, the timer outputs a 1 signal to the and-input of the store 12 so that the and-condition of the S-side exists and the store 12 flip-flops. A 1 signal therefore appears at the output of store 12 and relay 16 picks up after an inherent delay $\Delta T$, so that contacts 17 close. Consequently, a braking current which arises from the total braking voltage $u_g - u_r$ and which is proportional to the height of the hatched area in FIG. 1 flows from the battery 19 through diode 20 and winding 21 of the motor 5.

The braking current brakes the motor and therefore reduces the speed-dependent back-voltage $u_R$. The back voltage $u_r$ passes through zero a second time, on this occasion towards a positive value. Since the back voltage is smaller than the battery voltage $u_g$, the total braking voltage $u_g - u_r$ does not change sign. Because of the continuing deceleration of the rotor and because of the disappearance of the magnetic remanence, the back-voltage $u_r$ drops asymptotically towards the zero line and the total voltage $u_g - u_r$ rises correspondingly to the battery potential $u_g$ again. The rotor finally stops and the correspondingly set timing $t_B$ of the timer 10 ends. As a result, the R-side of store 12 is energized and flip-flops so the relay 16 drops. Braking is therefore at an end. The braking time and more particularly the braking distance are therefore reduced, depending upon circumstances, to, for example less than half, the spread is improved considerably and the accuracy of adjustment is improved correspondingly.

As a variant of the system shown in FIG. 3, the 1 signal in the timer 10 return to 0 only when the switch 7 recloses. In this case, the inversion station 8' is shifted into the line extending to the and-gate input. In this embodiment, the rotor is retained in the "off" state by the d.c. from the battery 19.

Also, the store 12 can be replaced by a simple and-gate if the trigger 14 is replaced by a trigger which outputs a time jump, for instance, of duration $t_B$, from the time at which there is voltage equality.

Another possibility for the trigger 14 to be connected not, as shown in FIG. 3, with an input side connected to the pole of the battery 19 but to the conductor S' to which the other pole of the battery 19 is connected. In this event, the trigger signals associated with the passage of the back voltage $u_r$ through zero occur later than in the case of the circuit arrangement shown in FIG. 3 but still lie within the required time range.

Another possibility is for the trigger 14 to be connected on the input side to two phases, for example, T and S, of the network. In this case, the trigger signal occurs at a passage of the network phase through zero. Since the network voltage frequency is slightly higher than the back-voltage frequency even at the commencement of braking, the network phase passes through zero earlier than the back-voltage but still later than the time of voltage equality in the example of FIG. 3.

Figure 4:
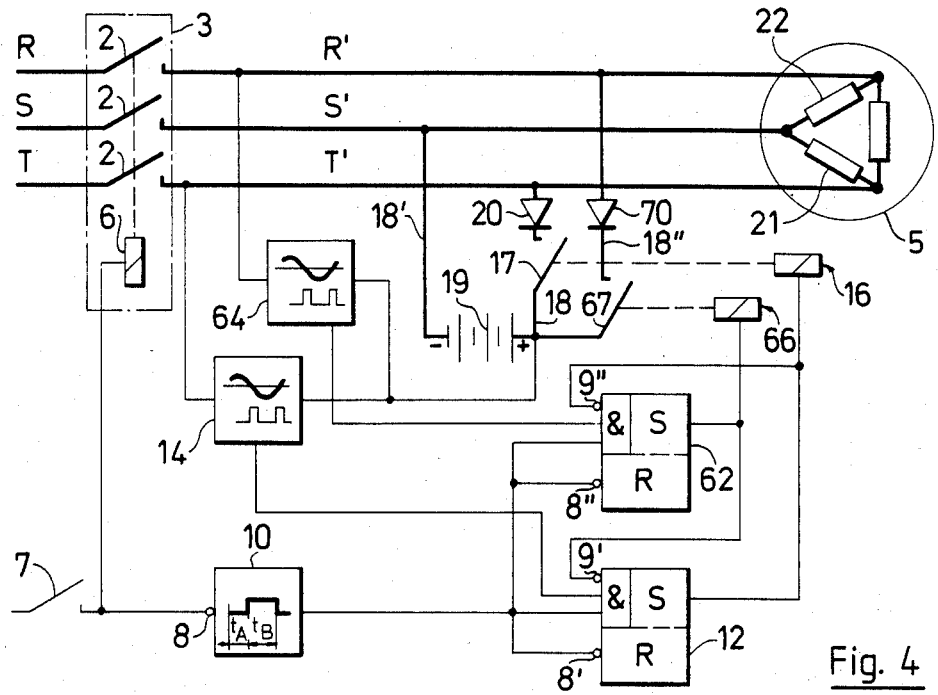
FIG. 4 illustrates a circuit diagram of a modified system employing a pair of triggers according to the invention.

Referring to FIG. 4, wherein like reference characters indicate like parts as above, the trigger 14 to which the back-voltage of the winding 21 and the braking d.c. voltage of the battery 19 are input has a second trigger 64 in parallel, to which the back voltage of a winding 22 and the braking d.c. voltage of the battery 19 are applied. Correspondingly, the store 12 has a second store 62 in parallel which is controlled by the trigger 64, the ouput of store 62 acting on a relay 66 having a contact set 67 disposed in a connecting line 18". A unidirectional path means 70 is also provided in the line 18" which is connected to the conductor R' and to the battery 19. The output of the timer 10 is connected to the input of the R-side of the second store 62 by way of an inversion station 8". Also, the output of the store 12 acts by way of an inversion station 9" on the and-input of the store 62 and the output thereof acts by way of an inversion station 9' on the and-input of the store 12.

The effect of the system shown in FIG. 4 is that the longest time from a brake instruction to the make time of the braking current is one-third less than in the embodiment of FIG. 3, for one of the two braking circuit arrangements is always in a satisfactory phase position in relation to the make time. The effect of the mutual blocking of the stores 12 and 62 by means of the inversion stations 9', 9" is that only the first braking circuit arrangement to respond is operative.

In a further development of the embodiment shown in FIG. 4, three parallel braking circuit arrangments are provided—i.e., one such arrangement acts on each one of the three windings of the motor 5. This feature provides a two-thirds reduction of the longest time between the brake instruction and the make time as compared with the embodiment of FIG. 3.

The embodiment of FIG. 5 is similar to the embodiment of FIG. 3 in that the total braking voltage $u_g - u_r$ is injected into the the trigger 14. Unlike the FIG. 3 embodiment, however, the d.c. braking current is derived not from a battery but from a transformer 30 whose primary side is connected to phases S and T. On the secondary side, the transformer 30 has a center-tap 31 connected by a line 18' to line S'. Ends 32, 33 of the secondary winding are connected via a respective thyristor 36, 37 to the line 18 extending to the conductor T'. Lines 40 having a respective diode 38, 39 extend, one each from the secondary winding ends 32, 33 respectively to one input of trigger 14, the other input thereof being connected via line 18 to the conductor T'. The output of the store 12 extends to a trigger 44 having two outputs each controlling one of the thyristors 36, 37.

The voltage pattern at tripping of the system in FIG. 5 is illustrated in FIG. 6, wherein the braking d.c. voltage $u_g$ is shown to grow periodically. As in FIGS. 1 and 2, the make time lies within the time interval z and determined by the first reference time $T_{r1}$ and the second time $T_{r2}$. The braking pattern grows in accordance with the voltage $u_g$.

In the system shown in FIG. 7, the longest time between the brake instruction time $T_1$ and the make time is halved because, as a further development of the system of FIG. 5, a braking voltage of different polarity is prepared. To this end, a second trigger 84 is connected in parallel to the first trigger 14 and is connected on input side by way of two lines 640, each having a diode 838 and 839, to the lines 40 and therefore to the transformer secondary winding ends, 32, 33. Also, the system of FIG. 7 has a second trigger 644 in parrallel to the first trigger 44 for controlling, by way of an output, two thryistors 636, 637 connected in parallel to the thyristors 36, 37. The triggers 14, 44 are interconnected by way of the first store 12 and the triggers 84, 644 are interconnected by means of a second store 62, the output of the first store 12 acting by way of the inversion station 9" on the and-input of the second store 62 and the output thereof acts by way of the inversion station 9' on the and-input of the first store 12. The forwards direction of the thyristors 636, 637 is opposite to that of the thyristors 36, 37. Similar considerations apply to the diodes 38, 39.

With the system shown in FIG. 7, after a tripping of the motor, braking is initiated the first time that the braking d.c. voltage $u_g$ equals the back-voltage $u_r$ since one of the two braking circuit arrangements is always of the correct conductivity—i.e., polarity. Since the stores 12 and 62 block one another, only the first braking circuit arrangement to respond is operative.

In the embodiment shown in FIG. 8, the braking d.c. is derived, as in the embodiment of FIG. 5, from a transformer 30 whose primary side is connected to phases S and T of the network. However, the two ends 32, 33 of the secondary winding extend to two opposite terminals 90 of a Graetz bridge 50 whose two other and also opposite terminals 91 are connected by way of lines 18, 18' to conductors T' and S' respectively and, therefore, to the ends of stator winding 21. The winding 21 is therefore connected to the same network phases S and T as the primary side of the transformer 30.

The bridge 50 comprises four thyristors 51 connected in known manner between the terminals and provides rectification. The thyristors 51 are RC-connected—i.e.

a series circuit arrangement comprising a resistance 52 and a capacitor 53 is connected in a parallel with each thyristor 51. The four thyristors 51 are controlled at a place B by a trigger 74 whose input, as in the case of the trigger 44 of FIG. 5, is connected to the output of the store 12.

Instead of a contactor 3 being used, the motor 5 of FIG. 8 is connected to the three-phase network by means of thyristors 711–714 and 721–724 and triggers 71, 72. The triggers 71, 72 can be supplied alternately on the input side by way of a double switch 77 with a pulse train or sequence from a source (not shown). Trigger 71 has four outputs M which are connected to thyristors 711 and 714. Similarly, the trigger 72 has four outputs N which are connected to the thyristors 721–724.

The thyristors 711, 712 connect, each in a different current direction, the conductor R' to the phase R and the thyristors 713, 714 similarly connect the conductor T' to the phase T. The thyristors 721, 722 correspondingly connect the conductor T' to the phase R and the thyristors 723, 724 connect the conductor R' to the phase T. Also, the inputs of the triggers 71, 72 are connected to the input of an or-gate 73 whose output extends by way of the inversion station 8 to the timer 10.

The double switch 77 can therefore supply the pulse sequence at choice either to the trigger 71 or to the trigger 72 or to neither of them. When the pulse sequence is supplied to the trigger 71, the rotor of the motor 5 runs in one direction, and when the pulse sequence is applied to the trigger 72, the rotor runs in the opposite direction. The frequency of the pulse sequence is such that, having regard to delays and other properties of the triggers 71, 72 and thyristors 711–714 and 721–724 and of three-phase current behaviour, there is no interruption in the supply of current to the motor 5. In both cases, the or-gate 73 also receives the pulse sequence and transmits a 0 signal which reaches the timer 10 in inverted form as a 1 signal. When the pulse sequence is interrupted by the double switch 77, the or-gate 73 ceases to receive a signal and therefore does not transmit one to the timer 10 so that the timer receives a 1 signal and initiates braking in the manner hereinbefore described. Also, the triggers 71, 72 stop in response to an interruption of the pulse sequence so that the thyristors 711–714 and 721–724 respectively do not fire and the current supply to the motor 5 is interrupted.

The special advantages of the system shown in FIG. 8 are the virtually complete lack of mechanical components, thus ensuring reliability and speed. Another advantage is the simplicity with which the direction of rotation of the motor 5 can be reversed, a very desirable feature for many purposes, more particularly in the operation of valves.

Instead of the Graetz bridge 50, a more complicated bridge can be used which is supplied with a three-phase current and thus ensures a smoother d.c. voltage pattern.

In all the systems hereinbefore described the giving of the braking instruction coincides with the tripping of the motor 5. However, this is not essential for the advantageous make time can be provided in the event of tripping lagging on the giving of the braking instruction.

What is claimed is:

1. A method of braking an asynchronous motor having a plurality of windings connected to a three-phase network voltage, said method comprising the steps of injecting a braking direct current voltage through a unidirectional path into at least one of the motor windings at a make time;

selecting the make time between a first reference time whereat the braking direct current voltage is closest to a back-voltage of said one motor winding at said first reference time and a second reference time leading a first peak in time of the back voltage to occur after said first reference time by an amount equal to 5% of the full periodicity of the network voltage; and wherein the braking direct current voltage at the make time has a polarity opposite to the polarity towards which the back-voltage tends at said first reference time.

2. A method as set forth in claim 1 wherein the braking direct current voltage is equal to the back-voltage at said first reference time.

3. A method as set forth in claim 1 wherein said step of injecting is triggered in response to one phase of the back-voltage of one motor winding passing through zero and wherein the polarity of the braking direct current voltage is opposite to the polarity of the back-voltage immediately after passage of the back-voltage phase through zero.

4. A method as set forth in claim 1 wherein said step of injecting is triggered in response to one phase of the network voltage passing through zero and wherein the polarity of the braking direct current voltage is opposite to the polarity of the network voltage immediately after passage of the network voltage phase through zero.

5. A method as set forth in claim 1 wherein said step of injecting is triggered in response to one phase of a braking voltage formed of the heterodynamic sum of the back-voltage and the braking direct current voltage passing through zero and wherein the polarity of the braking direct current voltage is opposite to the polarity of the braking voltage immediately after passage of the braking voltage through zero.

6. A method as set forth in claim 1 which further comprises the step of rectifying a current supplied from the three-phase network to the motor to produce the braking direct current voltage.

7. A method as set forth in claim 6 which further comprises the step of converting the voltage of said current from the network prior to rectification thereof.

8. A method as set forth in any one of claims 1 to 7 wherein a braking direct current voltage is injected into a plurality of the motor windings with braking of the motor being responsive only to the winding in which injection occurs first.

9. A method as set forth in any one of claims 6 and 7 which further comprises the steps of producing two direct current voltages of opposite polarity and injecting only the first of said two voltages to satisfy the braking injection conditions.

10. A method as set forth in any of claims 6 or 7 which further comprises the steps of producing two phase-shifted braking voltages and connecting only the first of the braking voltages to satisfy the braking injection conditions to the winding.

11. A system for braking an asynchronous motor having a plurality of windings connected to a three-phase network having a network voltage, said system comprising three motor feed lines connecting said network to said windings;

a motor actuator for selectively connecting and disconnecting said windings from said network;

means for producing a braking direct current voltage in response to disconnection of said windings from said network for injection to at least one of said windings; and a trigger responsive to disconnection of said windings from said network to control the injection of the produced braking direct current voltage to said one winding;

said means including a direct current supply means for producing a braking d.c. voltage and connected to a first input of said trigger;

a first connecting line between one of said feed lines to one of said windings and said supply means;

a second connecting line between a second feed line to said one winding and said supply means to receive a produced braking voltage from said supply means;

a switching element in said second connecting line for selectively opening and closing said second connecting line;

a unidirectional path means in said second connecting line for conveying the braking voltages to said one winding;

a third connecting line between at least one of said feed lines and a second input of said trigger to convey a back voltage to said trigger in response to dis-connection of said windings from said network; and an AND-gate having one input connected to an output of said trigger to receive a control signal therefrom in response to a zero difference between the voltages at said inputs of said trigger, a second input connected to said motor actuator to receive a second control signal therefrom in response to actuation of said actuator, and an output connected to said switching element to close said switching element in response to the presence of said control signals whereby the braking voltage from said supply means flows through said second connecting line to said one winding.

12. A system as set forth in claim 11 wherein said third connecting line connects said second input of said trigger to two of said three motor feed lines.

13. A system as set forth in claim 11 which further comprises a second trigger in parallel with the first trigger;

a fourth connecting line between a second of said motor feed lines and said direct current supply means to receive a produced braking voltage from said supply means;

a second switching element in said fourth connecting line for opening and closing said fourth connecting line;

a second unidirectional path means in said fourth connecting line;

a second AND-gate in parallel to the first AND-gate and having one input connected to an output of said second trigger, a second input connected to said motor actuator and an output connected to said second switching element, said output of said first AND-gate being connected with inversion to an input of said second AND-gate.

14. A system as set forth in claim 11 wherein said supply means is a transformer connected to said network and which further comprises a rectifier circuit arrangement connected with said transformer and having said unidirectional path means therein.

15. A system as set forth in claim 1 wherein said rectifier circuit arrangement includes thyristors and said switching element is a trigger connected to said thyristors.

16. A system as set forth in claim 15 wherein said thyristors are RC-wired and connected together to form a Graetz bridge.

17. A system as set forth in any one of claims 14, 15 and 16 which further comprises a plurality of thyristors in said feed lines connecting said motor to said network and at least one trigger connected to and between said latter thyristors and said motor actuator, and wherein said motor actuator is a switch for generating a pulse sequence to energize said one trigger.

* * * * *

UNITED STATES PATENT AND TRADEMARK OFFICE
CERTIFICATE OF CORRECTION

PATENT NO. : 4,612,490

DATED : September 16, 1986

INVENTOR(S) : Ulrich Kagi

It is certified that error appears in the above-identified patent and that said Letters Patent is hereby corrected as shown below:

```
Column 1, line 27 "to" should be -on-
Column 1, line 68 "previously" should be -previous-
Column 2, line 54 "satisy" should be -satisfy-
Column 2, line 56 "satisy" should be -satisfy-
Column3,  line 45 "enegerize" should be -energize-
Column 4, line 28 "irdentical" should be -identical-
Column 6, line 10 "return" should be -returns
Column 6, line 19 after "possibility" insert -is-
Column 7, line 24 after "ond" insert -reference-
Column 7, line 35 "parrallel" should be -parallel-
Column 8, line 2 "in a" should be -in-
```

Signed and Sealed this

Twenty-fourth Day of March, 1987

Attest:

DONALD J. QUIGG

Attesting Officer

Commissioner of Patents and Trademarks